G. F. DECKER.
Car Truck.
No. 24,201.
Patented May 31, 1859.
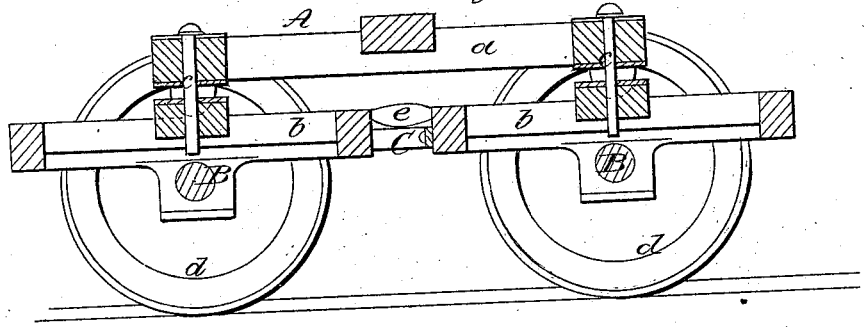
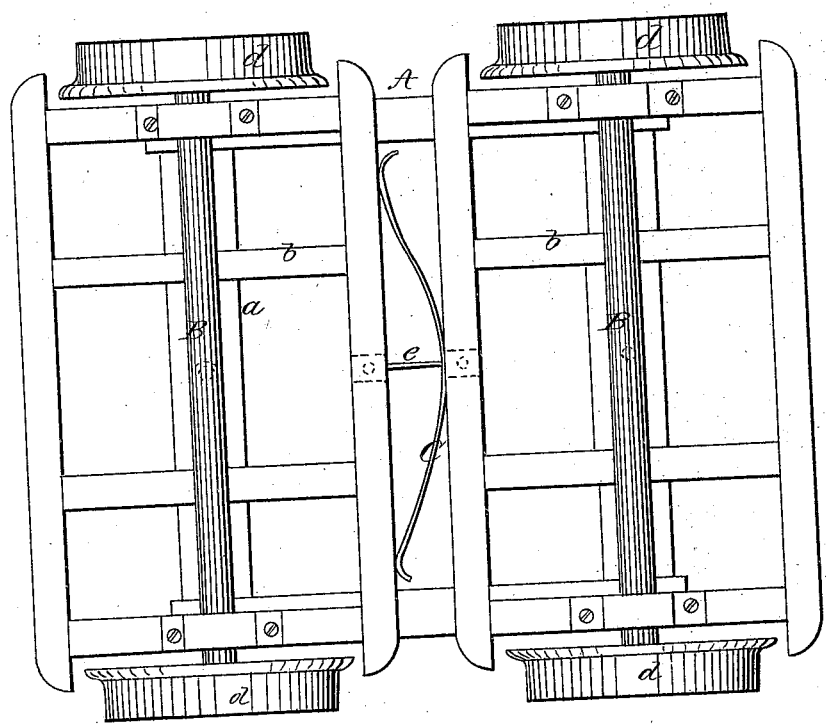
Witnesses:
Inventor:

UNITED STATES PATENT OFFICE.

G. F. DECKER, OF SCRANTON, PENNSYLVANIA.

RAILROAD-CAR TRUCK.

Specification of Letters Patent No. 24,201, dated May 31, 1859.

*To all whom it may concern:*

Be it known that I, G. F. DECKER, of Scranton, in the county of Luzerne and State of Pennsylvania, have invented a new and useful Improvement in Railroad-Car Trucks; and I do hereby declare that the following is a full, clear, and exact description of the same, reference being had to the annexed drawings, making a part of this specification, in which—

Figure 1, is a side vertical elevation of my improvement. Fig. 2, is an inverted plan of ditto.

Similar letters of reference indicate corresponding parts in the two figures.

The object of this invention is to allow the axles of the wheels to have an independent movement of each other so that in passing over curves they may assume radial positions or form radii of the curve thereby allowing the trucks to pass over the curvatures with much less friction than usual and without subjecting the axles to the great strain consequent on the ordinary mode of construction.

To enable those skilled in the art to fully understand and construct my invention I will proceed to describe it.

A, represents one of the trucks of a railroad car containing two pairs of wheels. The truck A, is formed of three parts $a$, $b$, $b$. The part $a$, may be considered the bed piece of the truck, and the parts $b$, $b$, are frames which are connected with the part by king bolts $c$, $c$, said bolts passing through the centers of the frames and serving as centers on which they turn. The bed piece $a$ is connected with the car by a central bolt as usual. The frames $b$, $b$, are of equal size and are attached one to the front and the other to the back end of the bed piece $a$, and in each frame $b$, an axle B, is placed, provided with the usual wheels $d$, $d$. The two frames $b$, $b$, are connected at their inner sides at their centers by a spring $e$, which may be formed of a flat steel plate having its ends attached rigidly to each frame, and a spring C, is placed between the two frames. The spring C, may be of semi-elliptic or any proper form and attached to either frame, and it is designed to have it of sufficient strength to keep the two frames $b$, $b$, parallel with each other when the truck is moving over a straight road. When however the trucks are passing over curves the frames $b$, $b$, and consequently the axles B, B, will assume radial positions relatively with the curve, the spring $e$, forming such a connection between the two frames as to permit of this movement or adjustability of the frames, and when the truck has passed over a curve the frames $b$, $b$, are brought back parallel with each other by the spring C.

By this simple arrangement the great friction hitherto attending the passing of the trucks over the curves of the road as well as the strain to which the axles are subjected are avoided.

I am aware that the axles of car wheels have been arranged separately and I do not claim broadly such device, but I am not aware that axles have been placed in independent frames connected by a spring or flexible plate and used in connection with a spring for preserving their parallelism when passing over straight rails, or portions of the road.

I claim therefore as new and desire to secure by Letters Patent,

Placing the axles B, of a truck in separate or independent frames $b$, $b$, attached to the bed piece $a$, as shown, and connected by a spring or flexible plate $e$, and used in connection with the spring C, arranged substantially as and for the purpose set forth.

GO. F. DECKER.

Witnesses:
HENRY N. DERBY,
J. W. SHEERER.